Patented June 28, 1927.

1,633,872

UNITED STATES PATENT OFFICE.

HUGH F. RIPPEY, OF SEATTLE, WASHINGTON, ASSIGNOR TO I. F. LAUCKS, INC., OF SEATTLE, WASHINGTON, A CORPORATION OF WASHINGTON.

PROCESS OF PRODUCING CRACKERS AND THE PRODUCTS OF SAID PROCESS.

No Drawing.   Application filed March 26, 1925. Serial No. 18,637.

My invention relates to the process of producing a cracker and to the product of said process.

A proper cracker involves problems peculiarly characteristic to the cracker art and which are not inherent in other baked products. Objection obtains to crackers as heretofore made in that the life of said crackers is relatively short,—six weeks to three months being the average life of the cracker. Considerable trouble obtains due to the cracker becoming stale and rancid, resulting in considerable loss. This rancidity is due to the breaking down of the fat used as shortening. To minimize the objectionable taste thus resulting, crackers have been surface salted, but there is a considerable demand for crackers that are not surface salted. A primary object of my invention is to provide an unsalted cracker which will have a much longer life, so far as becoming stale or rancid is concerned, than has heretofore been possible.

Furthermore, there is a demand for a cracker which is free of the soda taste. A primary object of my invention is to provide a cracker which will be free of the soda taste.

It has been claimed that coconut oil cannot be employed for the purpose of shortening in the production of crackers, for the reason that the product is exceptionally hard and tough.

A further primary object of my invention is to provide a cracker which will remain sweet and fresh for many months, even when stored in a warm place; also which will be characterized by not being too hard, and the body of which will not have a yellowish color.

My invention resides in the discovery of the proper materials and also in the proper length of period of treatment; also the proper degrees of temperature for the materials employed, and, particularly, the necessary proportions.

Ordinarily, the flour used in the making of crackers is characterized by having twenty-four per cent (24%) wet gluten content. By reason of my process, I am able to use flour having a gluten content as low as twenty-two per cent (22%) and obtain a texture equal to that obtained in employing flour with a gluten content of twenty-four per cent. The hardness of the cracker is in part a function of the gluten content. If the gluten content is too high, the cracker is too hard. Please note that the gluten content is only one of the factors determining the hardness of the cracker, however. If the cracker is too hard, it is not acceptable to the trade and rejections result in loss to the manufacturer. It is therefore important on the one hand to provide a cracker which is not too soft and at the same time is not too brittle. If the gluten content is less than twenty-two per cent, the dough cannot be well handled.

The length of the raising period is also of importance in the production of the desired product. Ordinarily, the raising period is eight hours in length. My investigation and experiments have made it clear that the raising process should be relatively rapid, and in my process the period is four to five hours. It will be noted that such shortening of the time reduces the cost and greatly facilitates increasing the quantity produced in a given work period.

Ordinarily, cracker dough has a temperature of thirty-two to thirty-four degrees centigrade (32–34° C.), i. e., eighty-nine to ninety-three degrees Fahrenheit (89–93° F.), but by my process I find that a relatively cold dough is much to be preferred, and employ a temperature of twenty-six to thirty degrees centigrade (26–30° C.) or seventy-nine to eighty-six degrees Fahrenheit (79–86° F.). Twenty-eight degrees centigrade (28° C.) or eighty-two degrees Fahrenheit (82° F.) is to be preferred.

The rancidity of crackers as heretofore made is due to the breaking down of the fat used as shortening, and the development of rancidity. I eliminate this difficulty by using coconut oil, having a low free fatty acid content, preferably not over 0.10%, (expressed as oleic acid), as a shortening. While acidity and rancidity are not synonymous, in general oil or fat does not become rancid until after considerable acid has been liberated. Ordinarily, crackers shortened with animal fats, or compounds of animal fats and vegetable oils, or vegetable oils other than coconut oil, become rancid and have a disagreeable odor in from six weeks to two months.

Instead of using baking soda as the means of raising the dough, I employ ammonia salts, for instance, ammonium bicarbonate.

This I find gives a much better color and flavor to the cracker. When baking soda is employed, carbon dioxide is liberated in the baking process, leaving sodium carbonate in the cracker with a resulting emphatic soda flavor. By employing the ammonium bicarbonate, the entire salt is volatilized in the baking operation, thereby eliminating any soda flavor and at the same time giving more raising power with respect to the salt. By using too small a proportion of the ammonium bicarbonate, the cracker does not raise sufficiently, and on the other hand using too large a proportion is objectionable in that the yellow color develops in the cracker of an intensity in proportion to the excess used.

In providing a cracker according to my invention, the cracker sponge is made employing flour, sugar, salt, yeast, water and shortening as follows:

To five hundred pounds (500#) of flour, having a gluten content of twenty-two to twenty-six percent, preferably twenty-two percent, two hundred and fifty pounds (250#) of water are added. To this is added forty to sixty pounds (40–60#) of melted coconut oil, characterized by having a low free fatty acid content preferably not more than 0.10%, (expressed as oleic acid), and a melting point of approximately seventy-two to seventy-four degrees Fahrenheit (72–74° F.) These ingredients are then well mixed. The yeast, salt and sugar, in approximately the following proportions, are dissolved in water having a temperature of about ninety degrees Fahrenheit (90° F); yeast, three pounds, (3#); sugar, six pounds (6#); salt, six pounds (6#). This solution, together with enough water to make a sponge dough of suitable consistency, is mixed with the flour and shortening as above prepared. This mixture is then run out into a suitable container for raising,—preferably a wooden trough. It is allowed to raise for some four to five hours at a temperature of eighty-two to ninety degrees Fahrenheit (82–90°F.) At the end of four or five hours, the sponge dough is returned to the mixer and three-quarters to one and one-quarter pounds (¾–1¼#) of ammonium bicarbonate, dissolved in water of twenty degrees centigrade (20° C.), together with sufficient flour to make a dough of the proper consistency, is added and mixed. The dough is returned to the trough and allowed to raise for a period of one to two hours at a temperature of eighty-two to ninety degrees Fahrenheit. It is then baked at four hundred and fifty degrees Fahrenheit (450° F.) for about seven minutes. By using less than forty pounds of fat to the batch as above indicated, a cracker is produced that is too hard, and on the other hand, if more than sixty pounds of fat are used, some of the fat works out of the dough, making it hard to handle in the kneading and rolling process, and results in a greasy product.

The above sets forth only a preferred form of embodiment of my invention, and, obviously, changes may be made in the proportions within the limits indicated. The example given will serve as a general guide for applying my invention.

I claim:

1. A base for a cracker dough comprising flour having a gluten content of twenty-two percent (22%), and coconut oil having a low free fatty acid content and a melting point of seventy-two to seventy-four degrees Fahrenheit.

2. A base for a cracker dough comprising flour having a minimum gluten content of twenty-two percent (22%), and coconut oil having a low free fatty acid content of not more than 0.10%, (expressed as oleic acid), and a melting point of seventy-two to seventy-four degrees Fahrenheit.

3. A cracker dough embodying coconut oil characterized by having a low free fatty acid content and a melting point of approximately seventy-two to seventy-four degrees Fahrenheit, and ammonia salts.

4. A cracker dough embodying coconut oil characterized by having a low free fatty acid content of not more than 0.10%, (expressed as oleic acid), and a melting point of approximately seventy-two to seventy-four degrees Fahrenheit, and ammonia salts.

5. A cracker dough embodying coconut oil characterized by having a low free fatty acid content and a melting point of approximately seventy-two to seventy-four degrees Fahrenheit, and ammonium bicarbonate.

6. A cracker dough embodying coconut oil characterized by having a low free fatty acid content of not more than 0.10%, (expressed as oleic acid), and a melting point of approximately seventy-two to seventy-four degrees Fahrenheit, and ammonium bicarbonate.

7. The process of making a cracker by mixing flour, water and melted coconut oil; adding to this yeast, salt and sugar and causing this mixture to raise for a period of four to five hours; adding ammonium bicarbonate dissolved in cold water, together with sufficient flour to make a dough of the proper consistency, and mixing the same; causing the dough to raise for a period of from one to two hours; rolling out the same; and baking said dough for about seven minutes.

8. A base for a cracker dough comprising flour and coconut oil having a low free fatty acid content and a melting point of seventy-two to seventy-four degrees Fahrenheit.

In witness whereof, I hereunto subscribe my name this 20th day of March, 1925.

HUGH F. RIPPEY.